(12) United States Patent
Joshi et al.

(10) Patent No.: US 11,973,739 B2
(45) Date of Patent: Apr. 30, 2024

(54) SYSTEMS AND METHODS FOR SUPPORTING HOST DEVICES WITH A SINGLE NETWORK ADDRESS WHEN MULTIPLE PREFIXES ARE DELEGATED

(71) Applicant: Verizon Patent and Licensing Inc., Basking Ridge, NJ (US)

(72) Inventors: Kiritkumar Joshi, Cupertino, CA (US); Jose M. Verger, Alamo, CA (US); Samirkumar Patel, Middlesex, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 17/304,207

(22) Filed: Jun. 16, 2021

(65) Prior Publication Data
US 2022/0407837 A1 Dec. 22, 2022

(51) Int. Cl.
| | |
|---|---|
| *H04L 61/5007* | (2022.01) |
| *H04L 12/46* | (2006.01) |
| *H04L 61/2503* | (2022.01) |
| *H04L 101/35* | (2022.01) |

(52) U.S. Cl.
CPC ...... *H04L 61/5007* (2022.05); *H04L 12/4641* (2013.01); *H04L 61/2503* (2013.01); *H04L 2101/35* (2022.05)

(58) Field of Classification Search
CPC ............. H04L 61/5007; H04L 12/4641; H04L 61/2503; H04L 2101/35; H04L 41/0894; H04L 61/2521; H04L 2101/659; H04L 2101/668; H04L 12/185; H04L 61/5014; H04L 45/74; H04W 80/10; H04W 84/12; H04W 80/04; H04W 80/02
See application file for complete search history.

(56) References Cited

U.S. PATENT DOCUMENTS

| | | | |
|---|---|---|---|
| 2009/0037595 A1* | 2/2009 | Breau ................. | H04L 61/4511 709/230 |
| 2012/0011274 A1* | 1/2012 | Moreman ........... | H04L 61/2528 709/238 |
| 2014/0056308 A1* | 2/2014 | Harrington ........... | H04L 45/741 370/401 |
| 2016/0182626 A1* | 6/2016 | Endahl .................... | H04L 67/01 709/203 |
| 2016/0285766 A1* | 9/2016 | Gottlib .............. | H04W 28/0215 |
| 2018/0054415 A1* | 2/2018 | Liang .................. | H04L 61/5014 |
| 2019/0029068 A1* | 1/2019 | Sturek ................ | H04W 84/047 |
| 2020/0267116 A1* | 8/2020 | Osterberg ........... | H04L 61/5092 |

* cited by examiner

*Primary Examiner* — Hitesh Patel

(57) ABSTRACT

A network device may delegate a first prefix length to a primary WAN interface and delegate a second prefix length to a backup WAN interface. The network device may assign a first primary prefix and a first backup prefix to a first VLAN interface and may assign a second primary prefix and a second backup prefix to a second VLAN interface. The network device may provide egress traffic from host devices, connected to the first VLAN interface and to the second VLAN interface, to the primary WAN interface and without prefix translation, when the primary WAN interface is available. The network device may provide ingress traffic to the host devices, via the primary WAN interface and without prefix translation, when the primary WAN interface is available.

18 Claims, 10 Drawing Sheets

SYSTEMS AND METHODS FOR SUPPORTING HOST DEVICES WITH A SINGLE NETWORK ADDRESS WHEN MULTIPLE PREFIXES ARE DELEGATED

BACKGROUND

On a typical network device (e.g., a customer premises equipment (CPE) router) there is at least one wide area network (WAN) interface and one or more local area network (LAN) interfaces (e.g., known as virtual LAN interfaces or VLAN interfaces). When Internet protocol version 6 (IPv6) addressing is used by these interfaces, a prefix (e.g., a /64 IPv6 prefix) is assigned to the WAN interface, from which all the IPv6 addresses are derived, both for the WAN interface, as well as for host devices (e.g., computers, Internet of Things (IoT) devices, and/or the like) connected to the VLAN interfaces.

DETAILED DESCRIPTION OF PREFERRED EMBODIMENTS

Figure 1A:
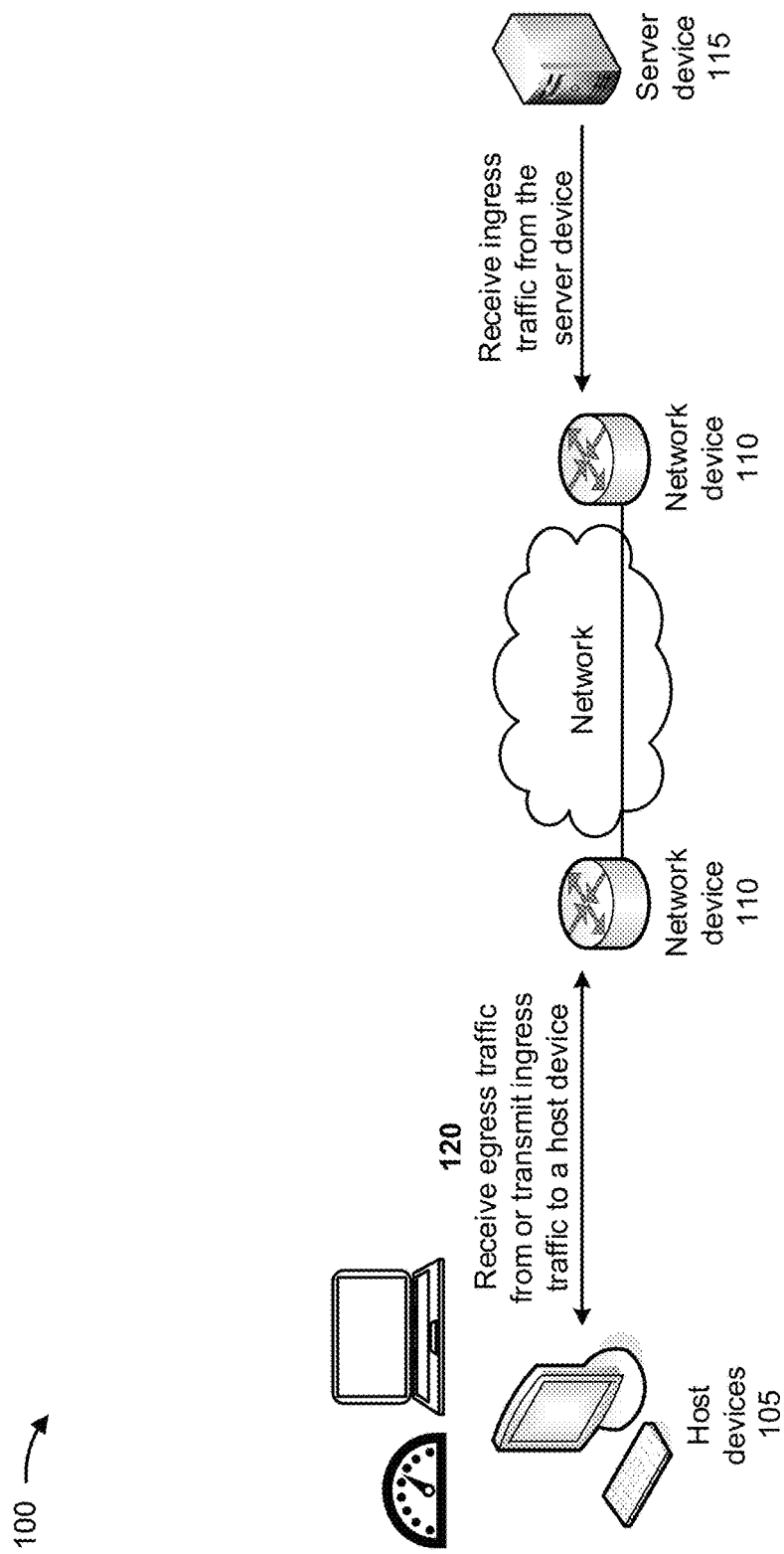
FIGS. 1A-1F are diagrams of an example associated with supporting host devices with a single network address, on a virtual interface of a network device, when multiple prefixes are delegated.

The following detailed description of example implementations refers to the accompanying drawings. The same reference numbers in different drawings may identify the same or similar elements.

If multiple VLAN interfaces for a network device are desired, then an /64 IPv6 prefix fails to suffice. Rather, multiple VLAN interfaces require delegation of a different size IPv6 prefix, such as, for example, a /60 IPv6 prefix (e.g., instead of the /64 IPv6 prefix). With the /60 IPv6 prefix delegated, the network device may create as many as sixteen subnets (e.g., /64 subnets), in total. One of the sixteen /64 IPv6 prefixes may be assigned to a WAN interface, and the remaining fifteen IPv6 prefixes (e.g., /64 each) may be assigned to each of the fifteen VLAN interfaces of the network device.

A network device in an enterprise environment (e.g., deployed in a branch office) may use two or more WAN interfaces, one of which may be used as a primary WAN interface, and the other as a secondary (or backup) WAN interface. When traffic is received from host devices communicating with the VLAN interfaces, and the primary WAN interface fails, the backup WAN interface takes over (e.g., becomes active), and provides uninterrupted service for the traffic. When both WAN interfaces are delegated with, for example, a /60 IPv6 prefix, a problem is created for the VLAN interfaces. The host devices connected to the VLAN interfaces would need to derive two IPv6 addresses, one IPv6 address derived from the primary WAN interface and another IPv6 address derived from the backup WAN interface. However, the host devices cannot function with multiple assigned IPv6 addresses. When the primary WAN interface is available, the host devices connected to the VLAN interfaces must use the IPv6 address derived from the IPv6 prefix delegated to the primary WAN interface. When the primary WAN interface fails, the host devices must use the IPv6 address derived from the IPv6 prefix delegated to the backup WAN interface. This causes a problem for the host devices since there is no way for the host devices to know which of the two WAN interfaces is active, at any given time.

Thus, current techniques for delegating multiple WAN interfaces consume computing resources (e.g., processing resources, memory resources, communication resources, and/or the like), networking resources, and/or other resources associated with losing traffic from the host devices when the primary WAN interface is unavailable, attempting to recover the lost traffic from the host devices, and/or the like.

Some implementations described herein provide a network device that supports host devices with a single network address, on a virtual interface of the network device, when multiple prefixes are delegated. For example, the network device may delegate a first prefix length to a primary WAN interface and may delegate a second prefix length to a backup WAN interface. The network device may assign a first primary prefix and a first backup prefix to a first VLAN interface and may assign a second primary prefix and a second backup prefix to a second VLAN interface. The network device may provide egress traffic from host devices, connected to the first VLAN interface and to the second VLAN interface, to the primary WAN interface and without prefix translation, when the primary WAN interface is available. The network device may provide ingress traffic to the host devices, via the primary WAN interface and without prefix translation, when the primary WAN interface is available.

In this way, the network device supports host devices with a single network address, on a virtual interface of the network device, when multiple prefixes are delegated. For example, the network device may eliminate a need for assigning multiple IPv6 addresses to the host devices connected to the VLAN interfaces when multiple IPv6 WAN interfaces are used. The network device may eliminate a need for assigning multiple IPv6 addresses, whether two WAN interfaces are utilized as a primary WAN interface and a backup WAN interface, or whether multiple active WAN interfaces are utilized concurrently based on a traffic steering policy. Thus, the network device may conserve computing resources, networking resources, and other resources that would have otherwise been consumed by losing traffic from the host devices when the primary WAN interface is unavailable, attempting to recover the lost traffic from the host devices, and/or the like.

FIGS. 1A-1F are diagrams of an example 100 associated with supporting host devices with a single network address, on a virtual interface of a network device, when multiple prefixes are delegated. As shown in FIGS. 1A-1F, example 100 includes host devices 105 associated with a network of network devices 110 and with a server device 115. Each of the host devices 105 may include a laptop computing device, a tablet computing device, a wireless device, a sensor, an IoT device, and/or the like. Further details of the host devices 105, the network devices 110, and the server device 115 are provided elsewhere herein.

As shown in FIG. 1A, and by reference number 120, the network device 110 may receive egress traffic from the host device 105 and/or may transmit ingress traffic to the host device 105. For example, the network device 110 may receive, from the host device 105, egress traffic that is destined for the server device 115. The network device 110 may forward the egress traffic to the server device 115 via the network and one or more other network devices 110. In another example, the network device 110 may receive, from the server device 115 and via the network, ingress traffic that is destined for the host device 105. The network device 110 may directly forward the ingress traffic to the host device 105 or may forward the ingress traffic to the host device 105 via the network and one or more other network devices 110.

Figure 1B:
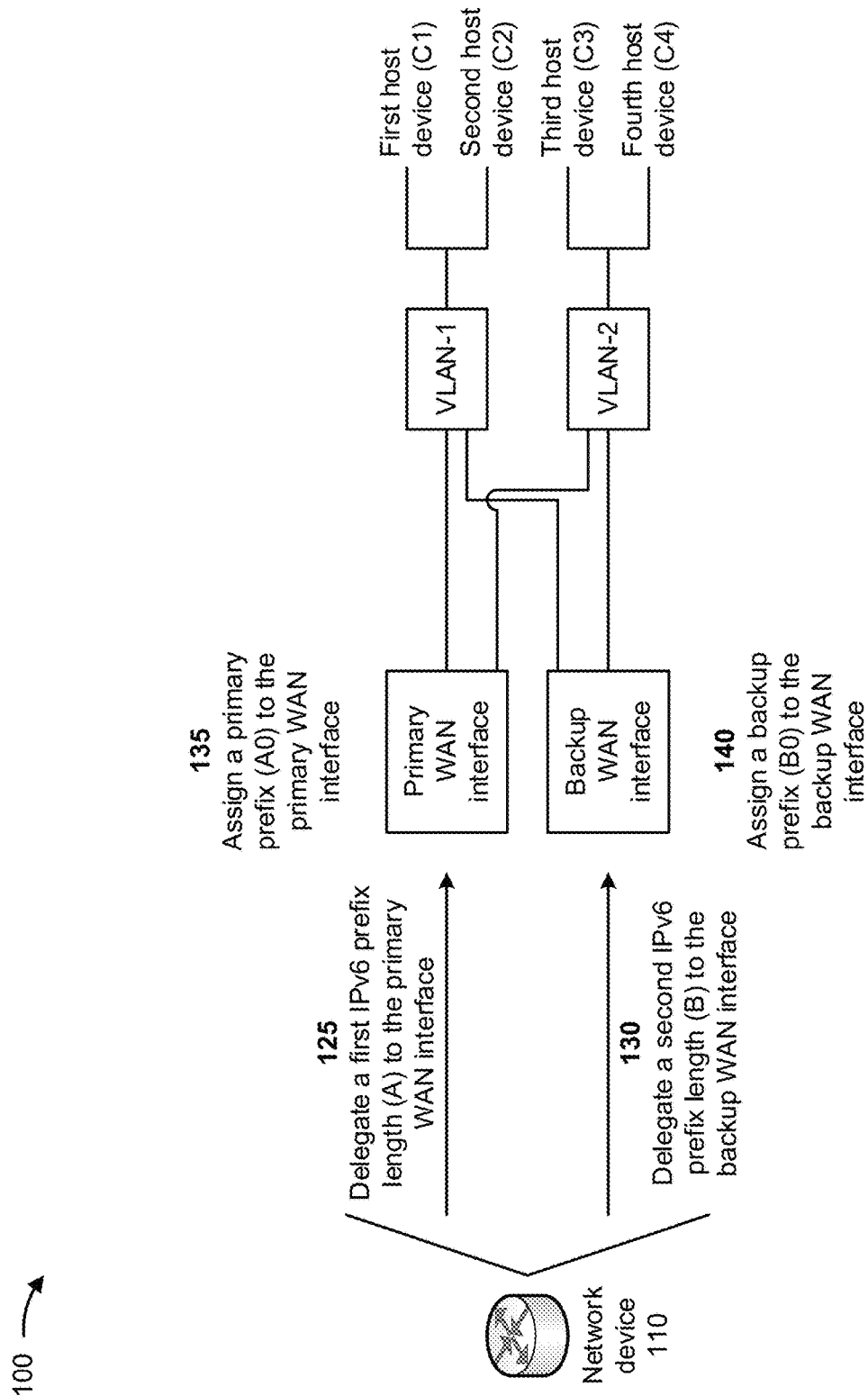

As shown in FIG. 1B, the network device 110 may include a primary WAN interface, a backup WAN interface, a first VLAN interface (VLAN-1), and a second VLAN interface (VLAN-2). The primary WAN interface may connect to the first VLAN interface and the second VLAN interface and may be utilized by the network device 110 to route traffic when the primary WAN interface is available. The secondary (or backup) WAN interface may connect to the first VLAN interface and the second VLAN interface and may be utilized by the network device 110 to route traffic when the primary WAN interface is unavailable. The first VLAN interface may connect with one or more host devices 105, such as a first host device 105 (C1) and a second host device 105 (C2). The second VLAN interface may connect with one or more host devices 105, such as a third host device 105 (C3) and a fourth host device 105 (C4).

As further shown in FIG. 1B, and by reference number 125, the network device 110 may delegate a first IPv6 prefix length (A) to the primary WAN interface. In some implementations, the first IPv6 prefix length may include a /60 IPv6 prefix length that provides as many as sixteen subnets (e.g., /64 subnets or /64 IPv6 prefixes), such as subnets A0 through A15.

As further shown in FIG. 1B, and by reference number 130, the network device 110 may delegate a second IPv6 prefix length (B) to the backup WAN interface. For example, the network device 110 may assign different prefix lengths to the primary WAN interface and the backup WAN interface, such that the second IPv6 prefix length may be different than the first IPv6 prefix length. In some implementations, the second IPv6 prefix length may include a /60 IPv6 prefix length that provides as many as sixteen subnets (e.g., /64 subnets or /64 IPv6 prefixes), such as subnets B0 through B15.

As further shown in FIG. 1B, and by reference number 135, the network device 110 may assign a primary prefix (A0) to the primary WAN interface. In some implementations, the primary prefix (A0) may be one of the sixteen subnets provided by the /60 IPv6 prefix length (e.g., the first IPv6 prefix length). In some implementations, the network device 110 may assign one of the /64 IPv6 prefixes (e.g., the primary prefix A0) to the primary WAN interface and may assign the remaining fifteen IPv6 prefixes (e.g., /64 each) to each of the fifteen VLAN interfaces of the network device 110 (e.g., if the network device 110 includes fifteen VLAN interfaces).

As further shown in FIG. 1B, and by reference number 140, the network device 110 may assign a backup prefix (B0) to the backup WAN interface. In some implementations, the backup prefix (B0) may be one of the sixteen subnets provided by the /60 IPv6 prefix length (e.g., the second IPv6 prefix length). In some implementations, the network device 110 may assign one of the /64 IPv6 prefixes (e.g., the backup prefix B0) to the backup WAN interface and may assign the remaining fifteen IPv6 prefixes (e.g., /64 each) to each of the fifteen VLAN interfaces of the network device 110 (e.g., if the network device 110 includes fifteen VLAN interfaces).

Figure 1C:
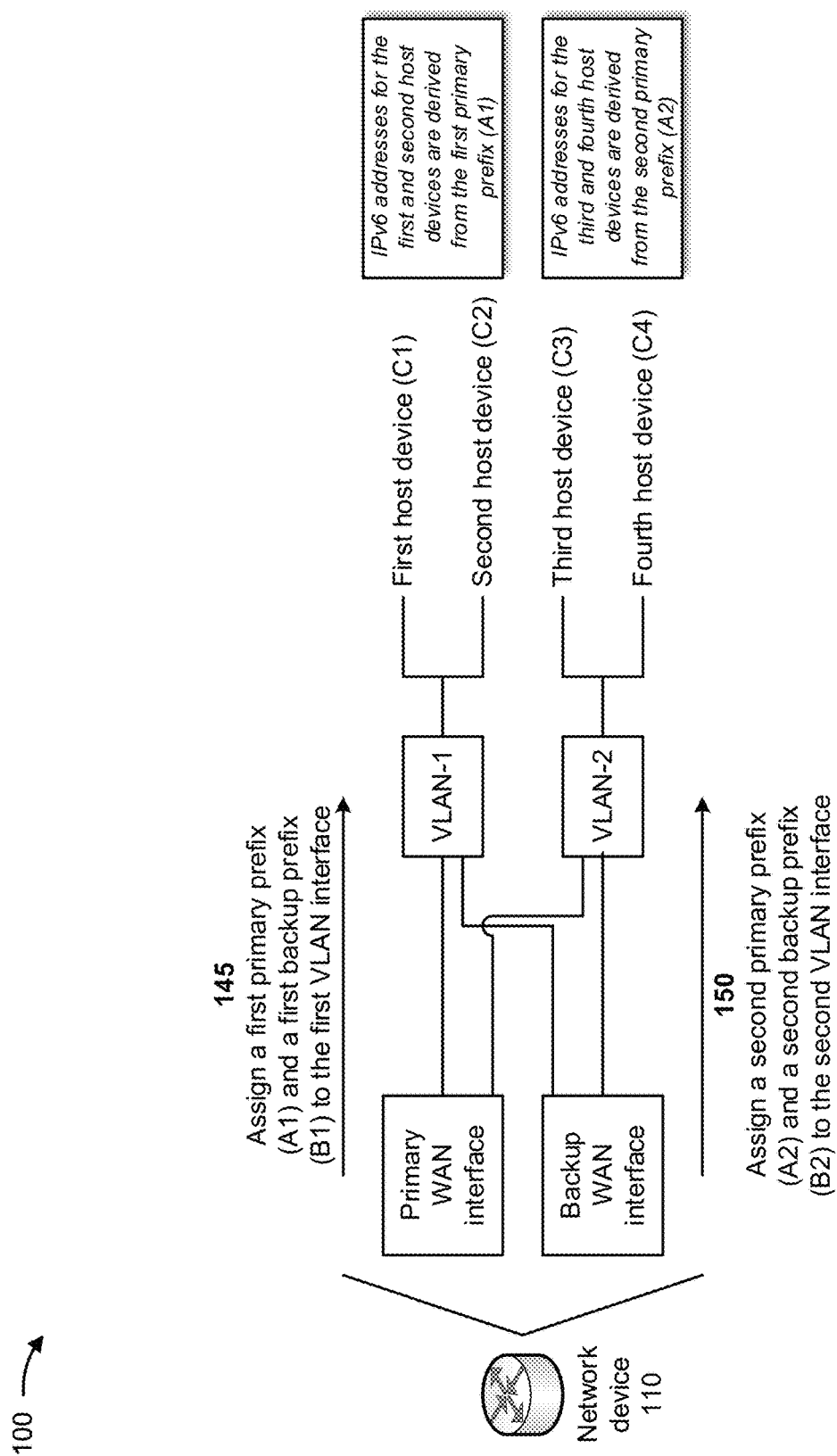

As shown in FIG. 1C, and by reference number 145, the network device 110 may assign a first primary prefix (A1) and a first backup prefix (B1) to the first VLAN interface. For example, the network device 110 may assign one of the remaining fifteen IPv6 prefixes (e.g., associated with the first IPv6 prefix length), as the first primary prefix (A1), to the first VLAN interface of the network device 110. The network device 110 may also assign one of the remaining fifteen IPv6 prefixes (e.g., associated with the second IPv6 prefix length), as the first backup prefix (B1), to the first VLAN interface of the network device 110.

As further shown in FIG. 1C, and by reference number 150, the network device 110 may assign a second primary prefix (A2) and a second backup prefix (B2) to the second VLAN interface. For example, the network device 110 may assign one of the remaining fifteen IPv6 prefixes (e.g., associated with the first IPv6 prefix length), as the second primary prefix (A2), to the second VLAN interface of the network device 110. The network device 110 may also assign one of the remaining fifteen IPv6 prefixes (e.g., associated with the second IPv6 prefix length), as the second backup prefix (B2), to the second VLAN interface of the network device 110.

As further shown in FIG. 1C, IPv6 addresses for the first host device 105 (C1) and the second host device 105 (C2) may be derived from the first primary prefix (A1). Furthermore, IPv6 addresses for the third host device 105 (C3) and the fourth host device 105 (C4) may be derived from the second primary prefix (A2).

Figure 1D:
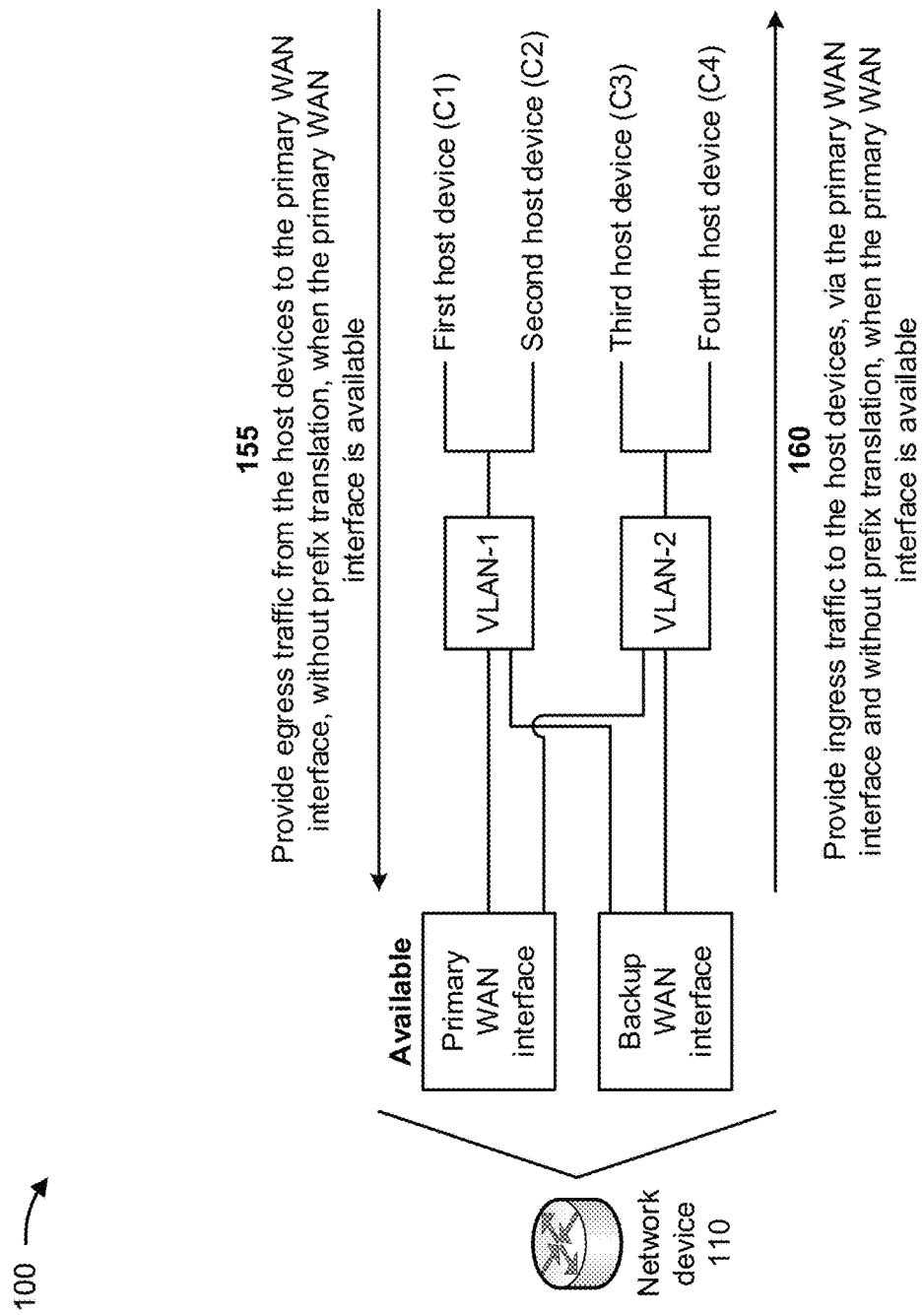

As shown in FIG. 1D, the primary WAN interface may be available for processing traffic. As further shown in FIG. 1D, and by reference number 155, the network device 110 may provide egress traffic from the host devices 105 to the primary WAN interface, without prefix translation, when the primary WAN interface is available. For example, if the network device 110 receives egress traffic from the first host device 105 (C1), the second host device 105 (C2), the third host device 105 (C3), and/or the fourth host device 105 (C4), the network device 110 may provide such egress traffic to the primary WAN interface, without prefix translation, when the primary WAN interface is available. The primary WAN interface may forward the egress traffic to a destination, such as the server device 115, via the network and one or more other network devices 110.

As further shown in FIG. 1D, and by reference number 160, the network device 110 may provide ingress traffic to the host devices 105, via the primary WAN interface and without prefix translation, when the primary WAN interface is available. For example, if the network device 110 receives ingress traffic from the server device 115, the network device 110 may provide such ingress traffic to one or more of the first host device 105 (C1), the second host device 105 (C2), the third host device 105 (C3), and/or the fourth host device 105 (C4), via the primary WAN interface and without prefix translation, when the primary WAN interface is available.

Figure 1E:
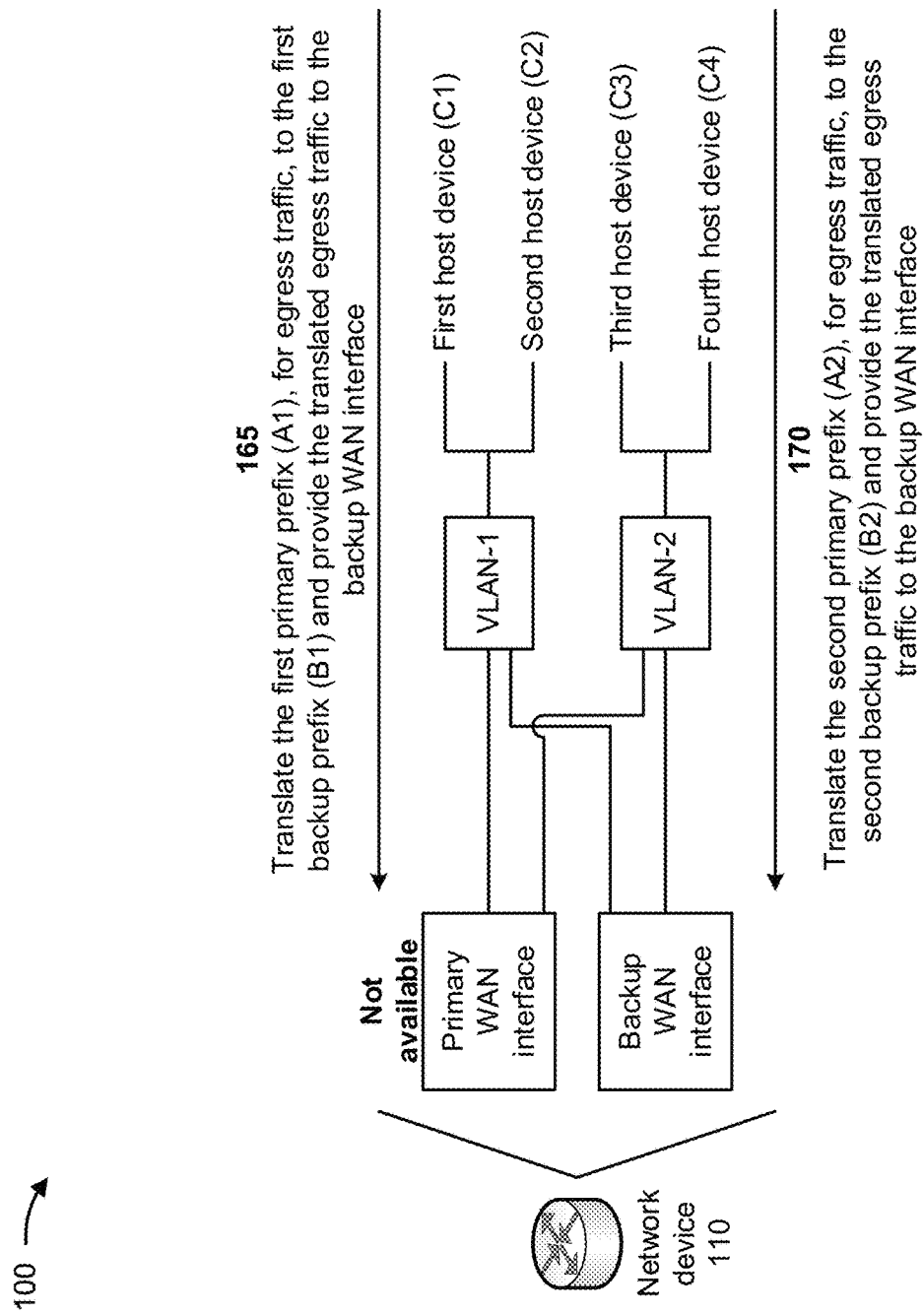

As shown in FIG. 1E, the primary WAN interface may become unavailable for processing traffic (e.g., due to traffic overload, hardware failure, and/or the like). As further shown in FIG. 1E, and by reference number 165, the network device 110 may translate the first primary prefix (A1), for egress traffic received from the host devices 105 associated with the first VLAN interface, to the first backup prefix (B1) and may provide the translated egress traffic to the backup WAN interface, when the primary WAN interface is unavailable. For example, if the network device 110 receives egress traffic from the first host device 105 (C1) and/or the second host device 105 (C2) (e.g., host devices 105 associated with the first VLAN interface), the network device 110 may translate the first primary prefix (A1), for such egress traffic, to the first backup prefix (B1) and may provide the translated egress traffic to the backup WAN interface, when the primary WAN interface is unavailable. The backup WAN interface may forward the translated egress traffic to a destination, such as the server device 115, via the network and one or more other network devices 110.

In some implementations, if the network device 110 determines that the primary WAN interface is available after being unavailable, the network device 110 may provide additional egress traffic, received from the host devices 105 associated with the first VLAN interface, to the primary WAN interface and without prefix translation. The primary WAN interface may forward the additional egress traffic to a destination, such as the server device 115, via the network and one or more other network devices 110.

As further shown in FIG. 1E, and by reference number 170, the network device 110 may translate the second primary prefix (A2), for egress traffic received from the host devices 105 associated with the second VLAN interface, to the second backup prefix (B2) and may provide the translated egress traffic to the backup WAN interface, when the primary WAN interface is unavailable. For example, if the network device 110 receives egress traffic from the third host device 105 (C3) and/or the fourth host device 105 (C4) (e.g., host devices 105 associated with the second VLAN interface), the network device 110 may translate the second primary prefix (A2), for such egress traffic, to the second backup prefix (B2) and may provide the translated egress traffic to the backup WAN interface, when the primary WAN interface is unavailable. The backup WAN interface may forward the translated egress traffic to a destination, such as the server device 115, via the network and one or more other network devices 110.

In some implementations, if the network device 110 determines that the primary WAN interface is available after being unavailable, the network device 110 may provide additional egress traffic, received from the host devices 105 associated with the second VLAN interface, to the primary WAN interface and without prefix translation. The primary WAN interface may forward the additional egress traffic to a destination, such as the server device 115, via the network and one or more other network devices 110.

Figure 1F:
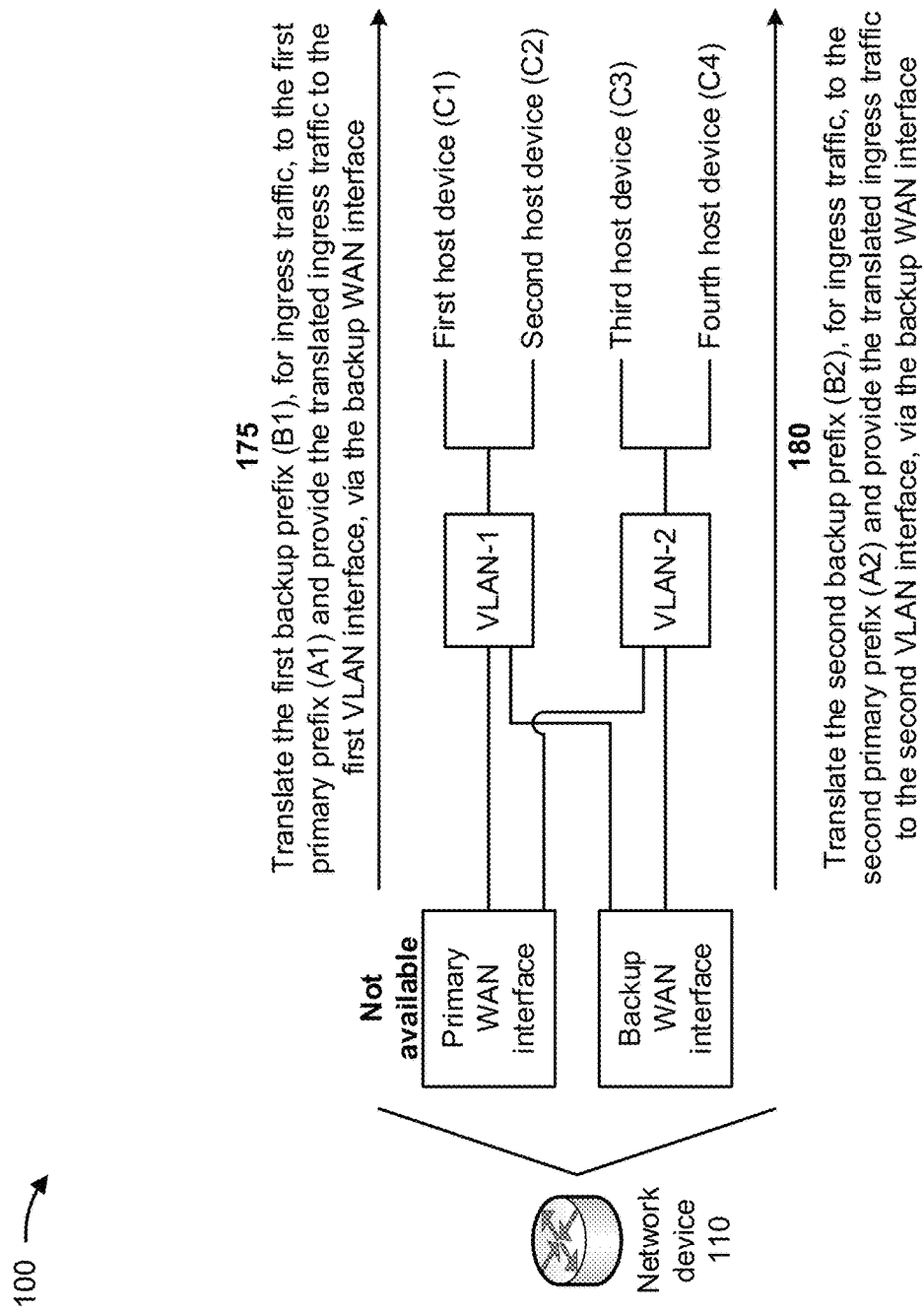

As shown in FIG. 1F, the primary WAN interface may become unavailable for processing traffic. As further shown in FIG. 1F, and by reference number 175, the network device 110 may translate the first backup prefix (B1), for ingress traffic destined for the host devices 105 associated with the first VLAN interface, to the first primary prefix (A1) and may provide the translated ingress traffic to the first VLAN interface, via the backup WAN interface, when the primary WAN interface is unavailable. For example, if the network device 110 receives, from the server device 115, ingress traffic destined for the first host device 105 (C1) and/or the second host device 105 (C2) (e.g., the host devices 105 associated with the first VLAN interface), the network device 110 may translate the first backup prefix (B1), for such ingress traffic, to the first primary prefix (A1) and may provide the translated ingress traffic to the first VLAN interface, via the backup WAN interface, when the primary WAN interface is unavailable. The first VLAN device may forward the translated ingress traffic to the first host device 105 (C1) and/or the second host device 105 (C2).

In some implementations, if the network device 110 determines that the primary WAN interface is available after being unavailable, the network device 110 may provide additional ingress traffic to the first VLAN interface, via the primary WAN interface and without prefix translation. The first VLAN device may forward the additional ingress traffic to the first host device 105 (C1) and/or the second host device 105 (C2).

As further shown in FIG. 1F, and by reference number 180, the network device 110 may translate the second backup prefix (B2), for ingress traffic destined for the host devices 105 associated with the second VLAN interface, to the second primary prefix (A2) and may provide the translated ingress traffic to the second VLAN interface, via the backup WAN interface, when the primary WAN interface is unavailable. For example, if the network device 110 receives, from the server device 115, ingress traffic destined for the third host device 105 (C3) and/or the fourth host device 105 (C4) (e.g., the host devices 105 associated with the second VLAN interface), the network device 110 may translate the second backup prefix (B2), for such ingress traffic, to the second primary prefix (A2) and may provide the translated ingress traffic to the second VLAN interface, via the backup WAN interface, when the primary WAN interface is unavailable. The second VLAN device may forward the translated ingress traffic to the third host device 105 (C3) and/or the fourth host device 105 (C4).

In some implementations, if the network device 110 determines that the primary WAN interface is available after being unavailable, the network device 110 may provide additional ingress traffic to the second VLAN interface, via the primary WAN interface and without prefix translation. The second VLAN device may forward the additional ingress traffic to the third host device 105 (C3) and/or the fourth host device 105 (C4).

In this way, the network device 110 supports the host devices 105 with a single network address, on a virtual interface of the network device 110, when multiple prefixes are delegated. For example, the network device 110 may eliminate a need for assigning multiple IPv6 addresses to the host devices 105 connected to the VLAN interfaces when multiple IPv6 WAN interfaces are used. The network device 110 may eliminate a need for assigning multiple IPv6 addresses, whether two WAN interfaces are utilized as a primary WAN interface and a backup WAN interface, or whether multiple active WAN interfaces are utilized concurrently based on a traffic steering policy. Thus, the network device 110 may conserve computing resources, networking resources, and other resources that would have otherwise been consumed by losing traffic from the host devices 105 when the primary WAN interface is unavailable, attempting to recover the lost traffic from the host devices 105, handling customer complaints associated with the lost traffic from the host devices 105, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

Figure 2:
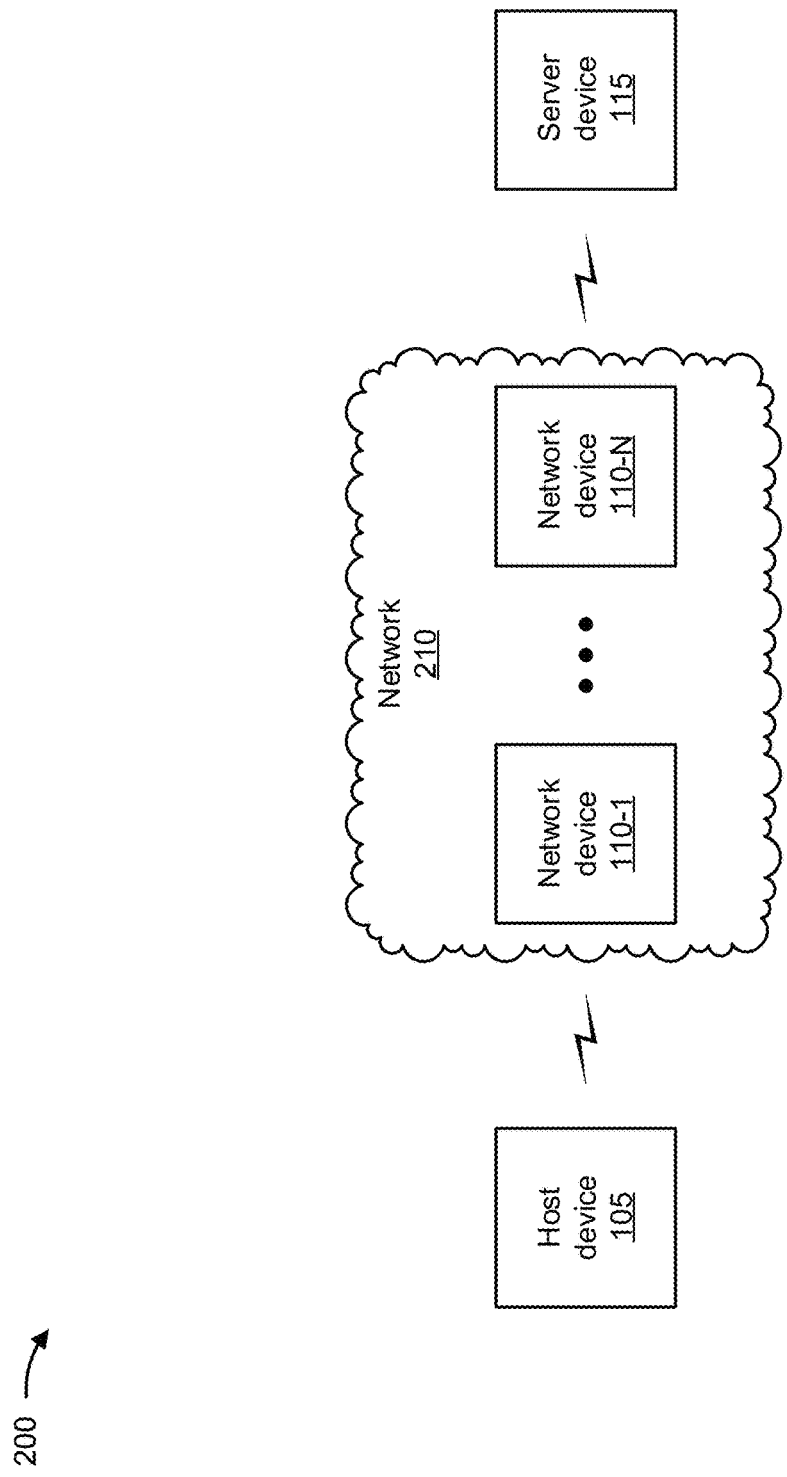
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the host device 105, a group of the network devices 110 (shown as network device 110-1 through network device 110-N), the server device 115, and a network 210. Devices of environment 200 may interconnect via wired connections, wireless connections, or a combination of wired and wireless connections.

The host device 105 includes one or more devices capable of receiving, generating, storing, processing, and/or providing information, such as information described herein. For example, the host device 105 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, an IoT device, a sensor device, or a similar type of device. In some implementations, the host device 105 may receive network traffic from and/or may provide network traffic to other host devices 105 and/or the server device 115, via the network 210 (e.g., by routing packets using the network devices 110 as intermediaries).

The network device 110 includes one or more devices capable of receiving, processing, storing, routing, and/or providing traffic (e.g., a packet or other information or metadata) in a manner described herein. For example, the network device 110 may include a router, such as a label switching router (LSR), a label edge router (LER), an ingress router, an egress router, a provider router (e.g., a provider edge router or a provider core router), a virtual router, or another type of router. Additionally, or alternatively, the network device 110 may include a gateway, a switch, a firewall, a hub, a bridge, a reverse proxy, a server (e.g., a proxy server, a cloud server, or a data center server), a load balancer, and/or a similar device. In some implementations, the network device 110 may be a physical device implemented within a housing, such as a chassis. In some implementations, the network device 110 may be a virtual device implemented by one or more computer devices of a cloud computing environment or a data center. In some implementations, a group of network devices 110 may be a group of data center nodes that are used to route traffic flow through the network 210.

The server device 115 includes one or more devices capable of receiving, generating, storing, processing, and/or providing information, such as information described herein. For example, the server device 115 may include a laptop computer, a tablet computer, a desktop computer, a group of server devices, or a similar type of device, associated with multicast traffic. In some implementations, the server device 115 may receive information from and/or transmit information (e.g., multicast traffic) to the host device 105, via network 210 (e.g., by routing packets using the network devices 110 as intermediaries).

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (NAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
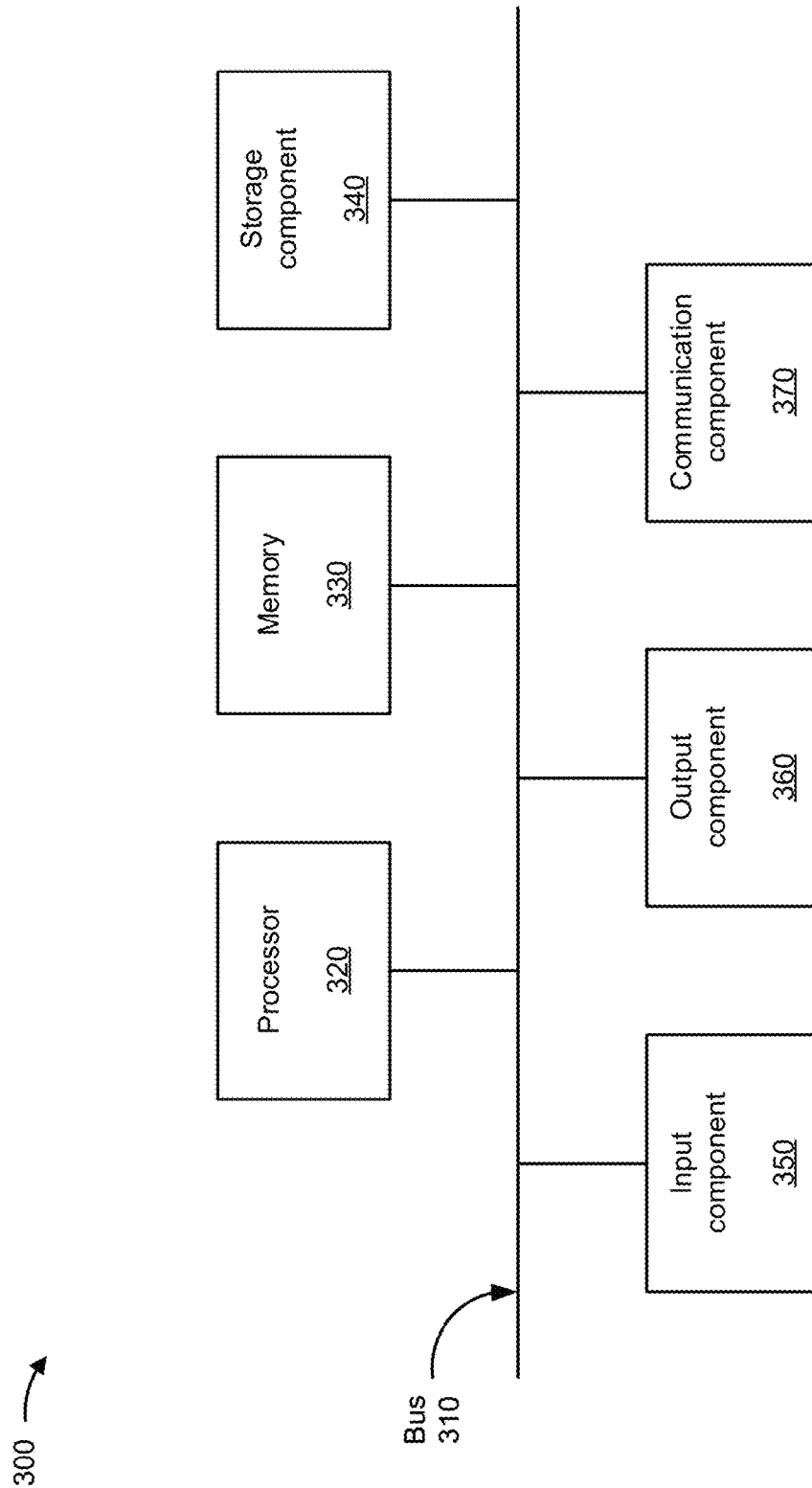
FIGS. 3 and 4 are diagrams of example components of one or more devices of FIG. 2.

FIG. 3 is a diagram of example components of one or more devices of FIG. 2. The one or more devices may include a device 300, which may correspond to the host device 105, the network device 110, and/or the server device 115. In some implementations, the host device 105, the network device 110, and/or the server device 115 may include one or more devices 300 and/or one or more components of the device 300. As shown in FIG. 3, the device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory). The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
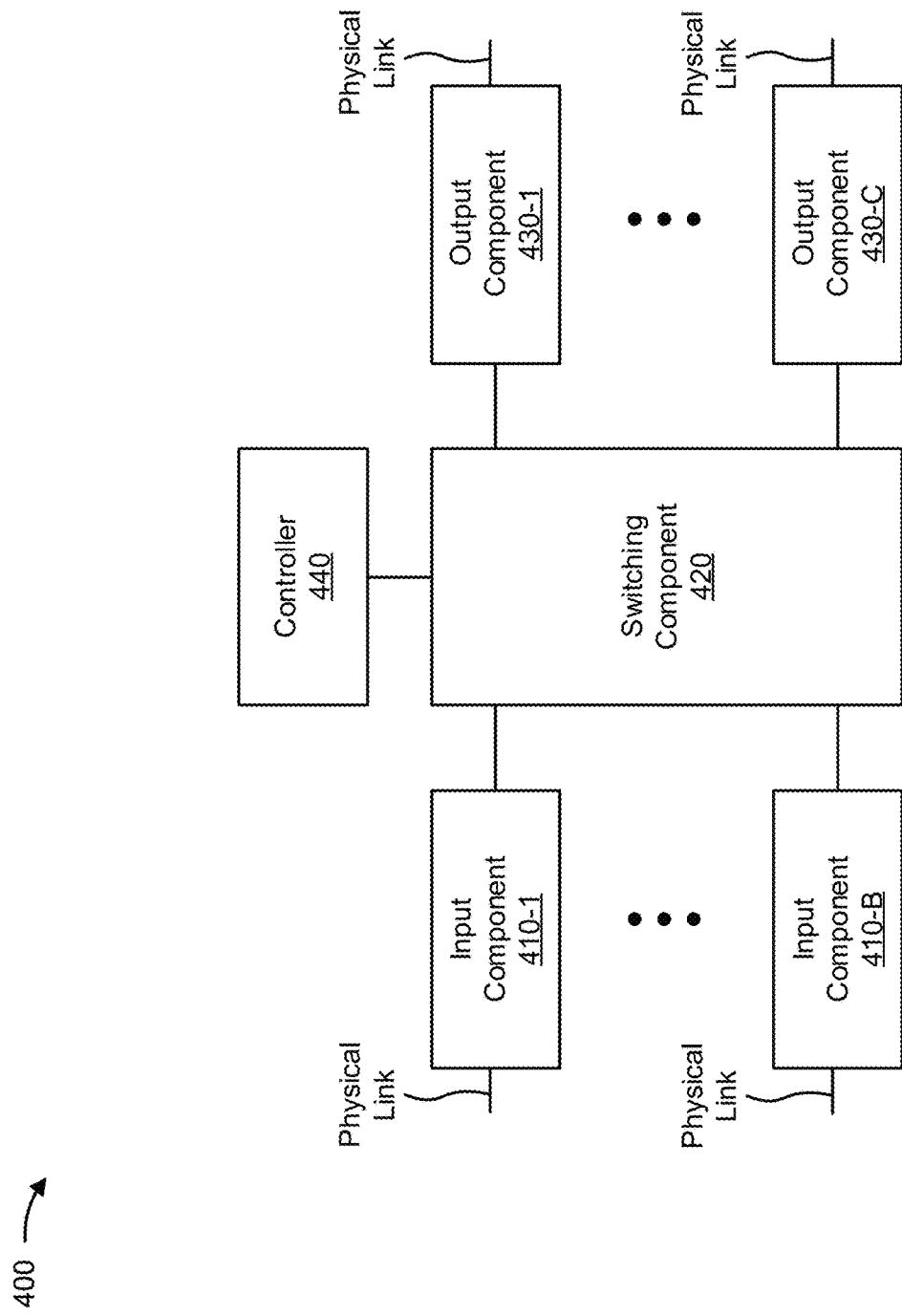

FIG. 4 is a diagram of example components of a device 400. Device 400 may correspond to the network device 110. In some implementations, the network device 110 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
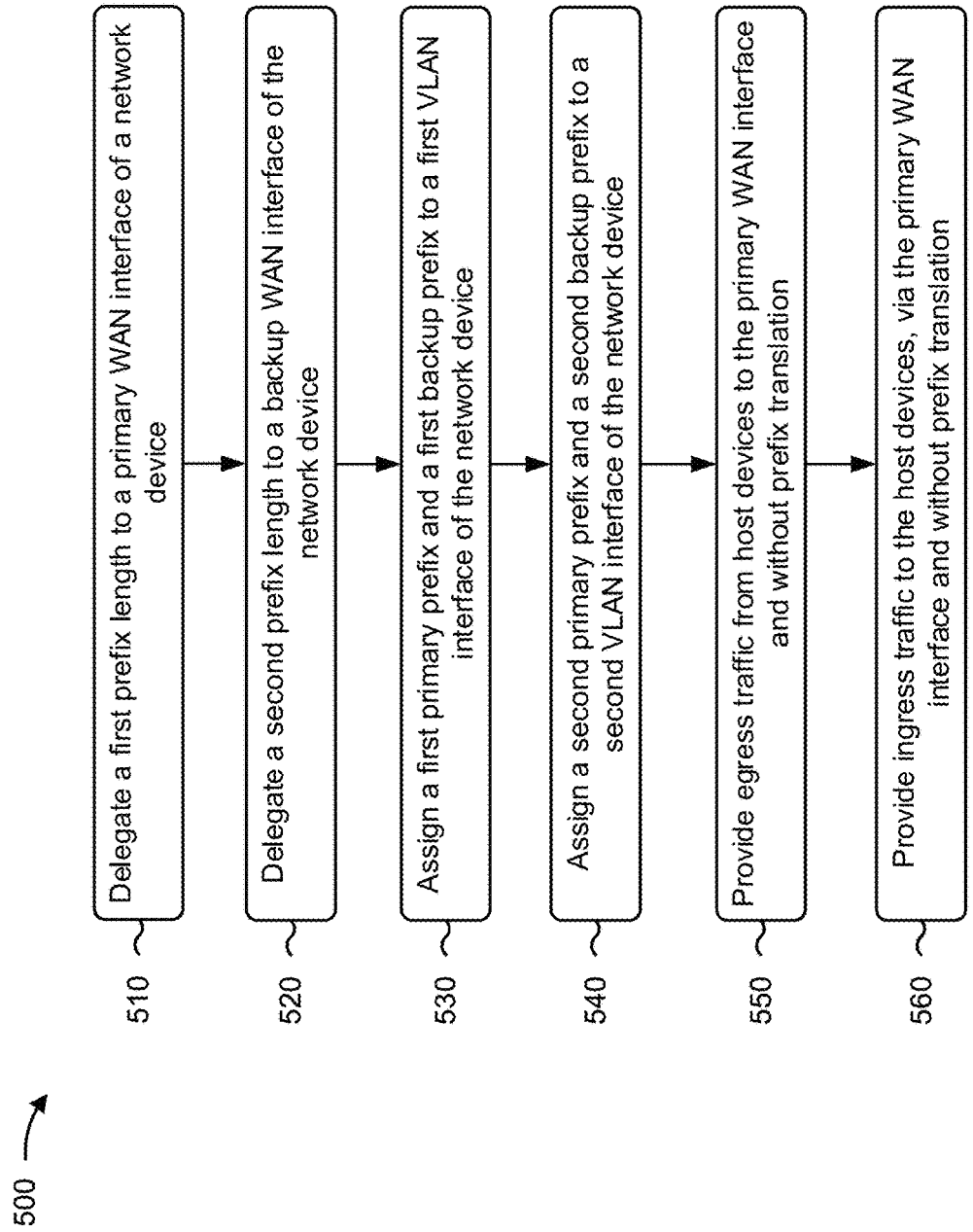
FIG. 5 is a flowchart of an example process for supporting host devices with a single network address, on a virtual interface of a network device, when multiple prefixes are delegated.

FIG. 5 is a flowchart of an example process 500 for supporting host devices with a single network address, on a virtual interface of a network device, when multiple prefixes are delegated. In some implementations, one or more process blocks of FIG. 5 may be performed by a network device (e.g., the network device 110). In some implementations, one or more process blocks of FIG. 5 may be performed by another device or a group of devices separate from or including the device, such as a host device (e.g., the host device 105) and/or a server device (e.g., the server device 115). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include delegating a first prefix length to a primary WAN interface of the network device (block 510). For example, the network device may delegate a first prefix length to a primary WAN interface of the network device, as described above.

As further shown in FIG. 5, process 500 may include delegating a second prefix length to a backup WAN interface of the network device (block 520). For example, the network device may delegate a second prefix length to a backup WAN interface of the network device, as described above. In some implementations, each of the first prefix length and the second prefix length is an Internet protocol version 6 prefix length.

As further shown in FIG. 5, process 500 may include assigning a first primary prefix and a first backup prefix to a first VLAN interface of the network device (block 530). For example, the network device may assign a first primary prefix and a first backup prefix to a first VLAN interface of the network device, as described above.

As further shown in FIG. 5, process 500 may include assigning a second primary prefix and a second backup prefix to a second VLAN interface of the network device (block 540). For example, the network device may assign a second primary prefix and a second backup prefix to a second VLAN interface of the network device, as described above. In some implementations, each of the first primary prefix, the first backup prefix, the second primary prefix, and the second backup prefix is an Internet protocol version 6 prefix.

As further shown in FIG. 5, process 500 may include providing egress traffic from host devices, connected to the first VLAN interface and to the second VLAN interface, to the primary WAN interface and without prefix translation, when the primary WAN interface is available (block 550). For example, the network device may provide egress traffic from host devices, connected to the first VLAN interface and to the second VLAN interface, to the primary WAN interface and without prefix translation, when the primary WAN interface is available, as described above.

As further shown in FIG. 5, process 500 may include providing ingress traffic to the host devices, via the primary WAN interface and without prefix translation, when the primary WAN interface is available (block 560). For example, the network device may provide ingress traffic to the host devices, via the primary WAN interface and without prefix translation, when the primary WAN interface is available, as described above.

In some implementations, network addresses for first host devices connected to the first VLAN interface are derived from the first primary prefix, and network addresses for second host devices connected to the second VLAN interface are derived from the second primary prefix.

Process 500 may include additional implementations, such as any single implementation or any combination of implementations described below and/or in connection with one or more other processes described elsewhere herein.

In some implementations, process 500 includes assigning a primary prefix to the primary WAN interface and assigning a backup prefix to the backup WAN interface.

In some implementations, process 500 includes translating the first primary prefix, for egress traffic received from first host devices associated with the first VLAN interface, to the first backup prefix and to generate translated egress traffic, when the primary WAN interface is unavailable, and providing the translated egress traffic to the backup WAN interface. In some implementations, process 500 includes determining that the primary WAN interface is available after being unavailable and providing additional egress traffic from the first host devices to the primary WAN interface, without prefix translation.

In some implementations, process 500 includes translating the second primary prefix, for egress traffic received from second host devices associated with the second VLAN interface, to the second backup prefix and to generate translated egress traffic, when the primary WAN interface is unavailable, and providing the translated egress traffic to the backup WAN interface. In some implementations, process 500 includes determining that the primary WAN interface is available after being unavailable and providing additional egress traffic from the second host devices to the primary WAN interface, without prefix translation.

In some implementations, process 500 includes translating the first backup prefix, for ingress traffic destined for first host devices associated with the first VLAN interface, to the first primary prefix and to generate translated ingress traffic, when the primary WAN interface is unavailable, and providing the translated ingress traffic to the first VLAN interface, via the backup WAN interface. In some implementations, process 500 includes determining that the primary WAN interface is available after being unavailable and providing additional ingress traffic to the first VLAN interface, via the primary WAN interface and without prefix translation.

In some implementations, process 500 includes translating the second backup prefix, for ingress traffic destined for second host devices associated with the second VLAN interface, to the second primary prefix and to generate translated ingress traffic, when the primary WAN interface is unavailable, and providing the translated ingress traffic to the second VLAN interface, via the backup WAN interface. In some implementations, process 500 includes determining that the primary WAN interface is available after being unavailable and providing additional ingress traffic to the second VLAN interface, via the primary WAN interface and without prefix translation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    delegating, by a network device, a first prefix length to a primary wide area network (WAN) interface of the network device;
    delegating, by the network device, a second prefix length to a backup WAN interface of the network device,
        wherein each of the first prefix length and the second prefix length is an Internet protocol version 6 prefix length, and
        wherein the second prefix length is different than the first prefix length;
    assigning, by the network device and based on delegating the first prefix length and the second prefix length, a first primary prefix and a first backup prefix to a first virtual local area network (VLAN) interface of the network device;
    assigning, by the network device and based on delegating the first prefix length and the second prefix length, a second primary prefix and a second backup prefix to a second VLAN interface of the network device,
        wherein each of the first primary prefix, the first backup prefix, the second primary prefix, and the second backup prefix is a unique prefix;
    providing, by the network device, egress traffic from host devices, connected to the first VLAN interface and to the second VLAN interface, to the primary WAN interface and without prefix translation, when the primary WAN interface is available; and
    providing, by the network device, ingress traffic to the host devices, via the primary WAN interface and without prefix translation, when the primary WAN interface is available.

2. The method of claim 1, further comprising:
    assigning a primary prefix to the primary WAN interface; and
    assigning a backup prefix to the backup WAN interface.

3. The method of claim 1, wherein network addresses for first host devices connected to the first VLAN interface are derived from the first primary prefix, and
    wherein network addresses for second host devices connected to the second VLAN interface are derived from the second primary prefix.

4. The method of claim 1, further comprising:
    translating the first primary prefix, for egress traffic received from first host devices associated with the first VLAN interface, to the first backup prefix and to generate translated egress traffic, when the primary WAN interface is unavailable; and
    providing the translated egress traffic to the backup WAN interface.

5. The method of claim 4, further comprising:
    determining that the primary WAN interface is available after being unavailable; and
    providing additional egress traffic from the first host devices to the primary WAN interface, without prefix translation.

6. A network device, comprising:
    one or more processors configured to:
        delegate a first prefix length to a primary wide area network (WAN) interface of the network device;
        delegate a second prefix length to a backup WAN interface of the network device,
            wherein each of the first prefix length and the second prefix length is an Internet protocol version 6 prefix length, and wherein the second prefix length is different than the first prefix length;

assign, based on deleting the first prefix length and the second prefix length, a first primary prefix and a first backup prefix to a first virtual local area network (VLAN) interface of the network device;

assign, based on delegating the first prefix length and the second prefix length, a second primary prefix and a second backup prefix to a second VLAN interface of the network device,
- wherein each of the first primary prefix, the first backup prefix, the second primary prefix, and the second backup prefix is a unique prefix;

provide egress traffic from host devices, connected to the first VLAN interface and to the second VLAN interface, to the primary WAN interface and without prefix translation, when the primary WAN interface is available; and provide ingress traffic to the host devices, via the primary WAN interface and without prefix translation, when the primary WAN interface is available.

7. The network device of claim 6, wherein the one or more processors are further configured to:

translate the second primary prefix, for egress traffic received from second host devices associated with the second VLAN interface, to the second backup prefix and to generate translated egress traffic, when the primary WAN interface is unavailable; and provide the translated egress traffic to the backup WAN interface.

8. The network device of claim 7, wherein the one or more processors are further configured to:

determine that the primary WAN interface is available after being unavailable; and provide additional egress traffic from the second host devices to the primary WAN interface, without prefix translation.

9. The network device of claim 6, wherein the one or more processors are further configured to:

translate the first backup prefix, for ingress traffic destined for first host devices associated with the first VLAN interface, to the first primary prefix and to generate translated ingress traffic, when the primary WAN interface is unavailable; and provide the translated ingress traffic to the first VLAN interface, via the backup WAN interface.

10. The network device of claim 9, wherein the one or more processors are further configured to:

determine that the primary WAN interface is available after being unavailable; and provide additional ingress traffic to the first VLAN interface, via the primary WAN interface and without prefix translation.

11. The network device of claim 6, wherein the one or more processors are further configured to:

translate the second backup prefix, for ingress traffic destined for second host devices associated with the second VLAN interface, to the second primary prefix and to generate translated ingress traffic, when the primary WAN interface is unavailable; and provide the translated ingress traffic to the second VLAN interface, via the backup WAN interface.

12. The network device of claim 11, wherein the one or more processors are further configured to:

determine that the primary WAN interface is available after being unavailable; and provide additional ingress traffic to the second VLAN interface, via the primary WAN interface and without prefix translation.

13. A non-transitory computer-readable medium storing a set of instructions, the set of instructions comprising:

one or more instructions that, when executed by one or more processors of a network device, cause the network device to:

delegate a first prefix length to a primary wide area network (WAN) interface of the network device;

delegate a second prefix length to a backup WAN interface of the network device,
- wherein the second prefix length is different than the first prefix length;

assign, based on delegating the first prefix length and the second prefix length, a first primary prefix and a first backup prefix to a first virtual local area network (VLAN) interface of the network device;

assign, based on delegating the first prefix length and the second prefix length, a second primary prefix and a second backup prefix to a second VLAN interface of the network device,
- wherein each of the first primary prefix, the first backup prefix, the second primary prefix, and the second backup prefix is a unique Internet protocol version 6 prefix;

provide egress traffic from host devices, connected to the first VLAN interface and to the second VLAN interface, to the primary WAN interface and without prefix translation, when the primary WAN interface is available; and provide ingress traffic to the host devices, via the primary WAN interface and without prefix translation, when the primary WAN interface is available.

14. The non-transitory computer-readable medium of claim 13, wherein network addresses for first host devices connected to the first VLAN interface are derived from the first primary prefix, and wherein network addresses for second host devices connected to the second VLAN interface are derived from the second primary prefix.

15. The non-transitory computer-readable medium of claim 13, wherein the one or more instructions further cause the network device to:

translate the first primary prefix, for egress traffic received from first host devices associated with the first VLAN interface, to the first backup prefix and to generate translated egress traffic, when the primary WAN interface is unavailable; and provide the translated egress traffic to the backup WAN interface.

16. The non-transitory computer-readable medium of claim 15, wherein the one or more instructions further cause the network device to:

determine that the primary WAN interface is available after being unavailable; and provide additional egress traffic from the first host devices to the primary WAN interface, without prefix translation.

17. The non-transitory computer-readable medium of claim 13, wherein the one or more instructions further cause the network device to:

translate the second primary prefix, for egress traffic received from second host devices associated with the second VLAN interface, to the second backup prefix and to generate translated egress traffic, when the primary WAN interface is unavailable; and provide the translated egress traffic to the backup WAN interface.

18. The non-transitory computer-readable medium of claim 17, wherein the one or more instructions further cause the network device to:
 determine that the primary WAN interface is available after being unavailable; and
 provide additional egress traffic from the second host devices to the primary WAN interface, without prefix translation.

* * * * *